(12) United States Patent
Halloran (10) Patent No.: US 6,996,937 B2
(45) Date of Patent: *Feb. 14, 2006

(54) POTENTIAL ENERGY STORAGE SYSTEM

(76) Inventor: John J. Halloran, 52 Whisper Dr., Worcester, MA (US) 01609

( * ) Notice: Subject to any disclaimer, the term of this patent is extended or adjusted under 35 U.S.C. 154(b) by 231 days.

This patent is subject to a terminal disclaimer.

(21) Appl. No.: 10/183,061

(22) Filed: Jun. 26, 2002

(65) Prior Publication Data

US 2003/0006612 A1  Jan. 9, 2003

Related U.S. Application Data

(63) Continuation-in-part of application No. 09/891,879, filed on Jun. 26, 2001, now Pat. No. 6,860,068.

(51) Int. Cl.
*B66B 9/04* (2006.01)
*E04B 1/98* (2006.01)
*E04H 9/02* (2006.01)

(52) U.S. Cl. .......................... 52/1; 52/167.6; 52/173.1; 52/741.1; 52/750; 290/1 R (58) Field of Classification Search .................. 52/1, 52/167.1, 167.4, 173.1, 741.1, 750; 290/1 R
See application file for complete search history.

(56) References Cited

U.S. PATENT DOCUMENTS

| | | | |
|---|---|---|---|
| 2,189,486 A | * | 2/1940 | Amico ............................. 52/67 |
| 3,396,944 A | * | 8/1968 | Jansz ......................... 254/89 H |
| 3,512,072 A | | 5/1970 | Karazija et al. .............. 320/61 |
| 3,939,356 A | | 2/1976 | Loane .......................... 290/52 |
| 4,217,077 A | | 8/1980 | Brcar .......................... 417/407 |
| 4,275,989 A | | 6/1981 | Gutierrez Atencio ....... 415/129 |
| 4,310,769 A | | 1/1982 | Mazzone et al. ............. 290/54 |
| 4,351,415 A | | 9/1982 | Kita ............................. 187/29 |
| 4,426,846 A | | 1/1984 | Bailey ......................... 60/398 |
| 4,443,707 A | | 4/1984 | Scieri et al. .................... 290/4 |
| 4,474,266 A | * | 10/1984 | Kallis ......................... 187/285 |
| 4,587,773 A | * | 5/1986 | Valencia .......................... 52/1 |
| 4,589,821 A | | 5/1986 | Rondot et al. .............. 415/111 |
| RE32,404 E | * | 4/1987 | Ferris ......................... 187/100 |
| 4,723,107 A | * | 2/1988 | Schmid ....................... 322/35 |
| 4,956,947 A | * | 9/1990 | Middleton ....................... 52/1 |
| 5,065,844 A | * | 11/1991 | Hon ........................... 187/275 |
| 5,365,704 A | * | 11/1994 | Ray ............................... 52/64 |
| 5,636,713 A | | 6/1997 | Perkins et al. .............. 187/274 |
| 5,870,892 A | * | 2/1999 | Gamoso ...................... 60/413 |
| 5,974,743 A | * | 11/1999 | Vaia .......................... 52/169.6 |
| 6,023,105 A | | 2/2000 | Youssef ....................... 290/54 |
| 6,050,207 A | * | 4/2000 | Mays .......................... 114/45 |
| 6,051,892 A | | 4/2000 | Toal, Sr. ...................... 290/43 |
| 6,525,431 B1 | * | 2/2003 | Clucas et al. ................. 290/2 |

FOREIGN PATENT DOCUMENTS

| | | |
|---|---|---|
| DE | 3104549 A1 | 9/1982 |
| EP | 0829445 A1 | 3/1998 |
| GB | 2341209 A | 3/2000 |

* cited by examiner

*Primary Examiner*—Robert Canfield
(74) *Attorney, Agent, or Firm*—Bowditch & Dewey, LLP (57) ABSTRACT

The present invention relates to a system for generating electrical power using hydraulic supports on which a building structure is mounted. A pump injects fluid into the supports to raise the building structure and thereby store energy in the elevated structure. A valve can be opened to deliver fluid under pressure to a turbine or hydraulic motor driven generator to generate electricity.

27 Claims, 6 Drawing Sheets

POTENTIAL ENERGY STORAGE SYSTEM

CROSS REFERENCES TO RELATED APPLICATIONS

The present application is a continuation-in-part of U.S. patent application Ser. No. 09/891,879, filed Jun. 26, 2001 now U.S. Pat. No. 6,860,068. The entire contents of the above application are incorporated herein by reference.

BACKGROUND OF THE INVENTION

Existing methods of electrical power generation used to provide alternative or backup power sources to established energy grid systems have various difficulties associated with them. These existing systems are often expensive, inefficient, have a limited lifetime and/or generation capacity.

A continuing need exists for improvements in power generation, particularly to offset electrical power demands during peak loads.

SUMMARY OF THE INVENTION

The present invention relates to a power conversion system that supplies electrical power to buildings or other facilities. The system can be used to meet the load demand for a designated building during the daily peak load hours. In a preferred embodiment, the system can be located in the basement of the building, and includes a plurality of single-acting hydraulic support cylinders or chambers arranged vertically below the building support columns and mounted on the foundation. Each cylinder is fitted with an inlet/outlet pipe at the bottom of the cylinder which is connected to a header which acts to equalize the level or pressure of the fluid medium within the system. The header connects to a reversible pump/turbine unit which generates electricity when the fluid is allowed to discharge from the hydraulic support cylinders, through the hydraulic turbine generator and into an atmospheric fluid reservoir/tank.

In off-peak hours, when external electrical energy is less expensive and in larger supply or if an internal storage battery system source is available, the generator is operated as a motor which runs the turbine as a pump. In this mode of operation, the fluid is drawn from the reservoir and pumped into the header system which delivers fluid at equal pressure to all the hydraulic support chambers. In one embodiment where the hydraulic fluid is water, slip sealed pressure plates accordingly rise in elevation carrying the bearing pads, vertical connecting links, and the entire building support steel structure with them. In another embodiment where the hydraulic fluid is hydraulic oil, cylinder pistons accordingly rise in elevation carrying the rods and the entire building support steel structure with them. The new elevation of the building and its weight thus provide potential energy on demand via the pressurized fluid which again can be fed to the inlet of the turbine generator.

In an embodiment, an external "Limited-Displacement Lateral Restraint System" is included to maintain vertical stability, as well as minimize or limit relative lateral movement of the building in relation to its foundation, especially during any seismic disturbances. The restraint system as well as other system components can be controlled by a computer or system controller programmed to provide automatic operation to optimize efficiency and power generation.

It is recognized that the system can be located in other structures such as a parking deck structure. The power can be used with the deck and associated structures, such as commercial buildings.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Various public utilities have used the "pumped storage" system which elevates large volumes of water several hundreds of feet to an upper reservoir, during off-peak hours when electrical power supplies are more available and less expensive. This stored energy, in the form of the potential energy of the elevated water, is then available on demand during peak periods. When required, the water is released, fed through large penstocks, into the inlet side of a large water-wheel-type turbine which is connected to a generator to produce electrical power. The prime-mover system used for this application is a reversible pump and turbine system which allows the generator to be run as a motor to drive the turbine in the reverse direction, thus operating as a pump to return the water again to the upper reservoir from the lower reservoir at the turbine discharge.

The current electric power market is focused on the need for addressing shortages of generation supply during peak-demand hours. New "distributed power" (e.g., small generators) has advantages such as capacity close to the demand load centers, reduction of load on main transmission and distribution lines by installation of more small generators closer to the load centers which are typically urban and suburban areas, and reduced emissions from fossil-fueled plants.

Prior systems for pumped storage hydroelectric generation have been based upon an upper and lower reservoir of water with the height difference being the key to creating the pressure head at the inlet to the turbine. Thus a practical system requires hundreds of feet of "head," as well as large volumes of water in order to generate power throughout the peak hours of a typical day. These requirements and the structures required to support the system are not practical for small plants distributed throughout urban and other densely settled areas.

Figure 1:
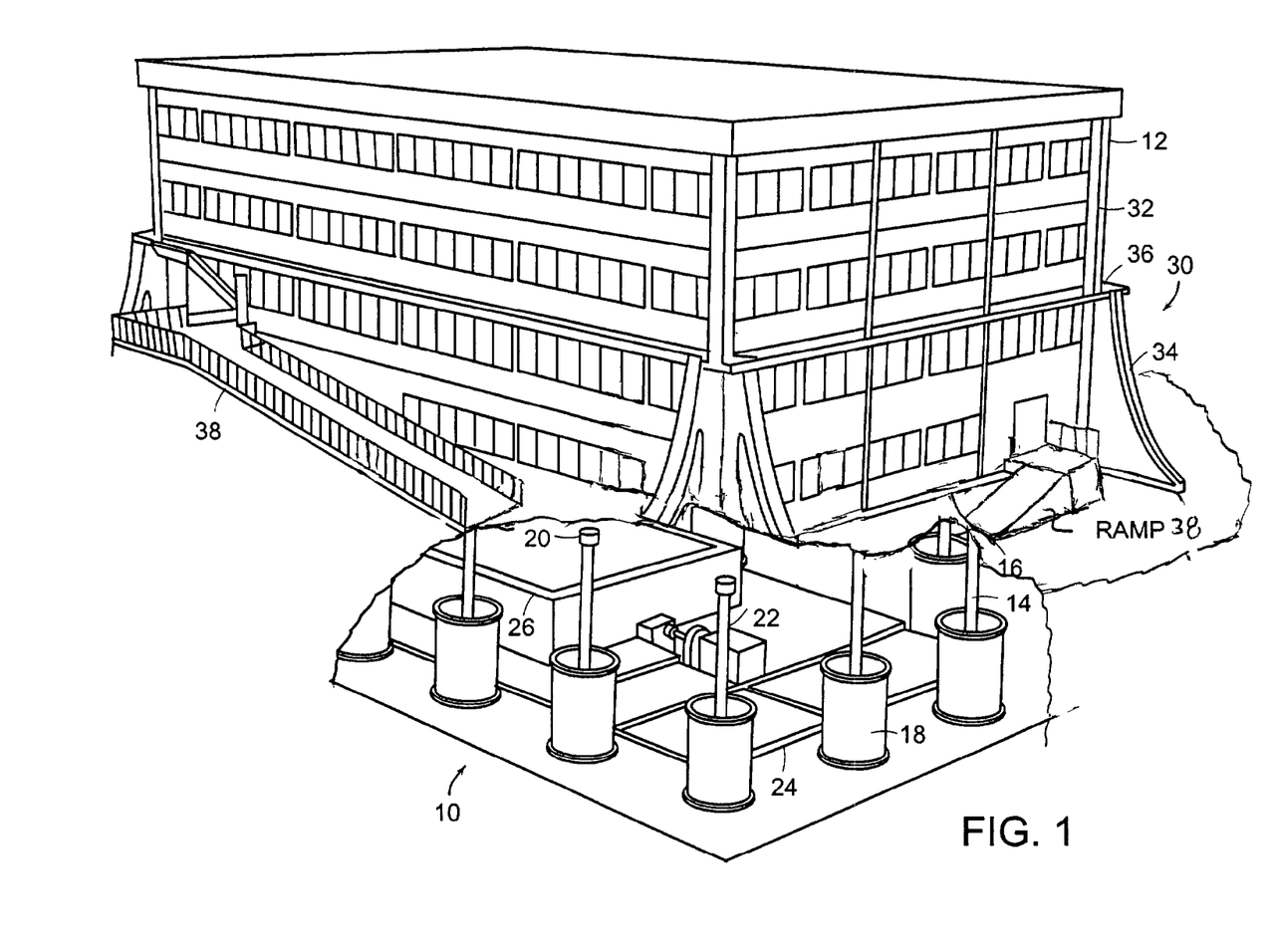
FIG. 1 is a perspective view of a building structure with portions broken away and having a hydraulic power system according to the invention.

The present invention relates to a hydraulic power system, designated generally as 10, and involves generation of electric power within a structure, such as a dedicated building structure 12 such as seen in FIG. 1. Since the size and weight of buildings is quite often proportional to their electricity supply needs, the weight of the building structure 12 is utilized to create the equivalent "head" of several hundreds of feet at the inlet of an hydraulic turbine or motor.

The hydraulic power system has a plurality of connection links or piston rods 14 that carry the structural steel 16 of the building structure 12. Each of the piston rods 14 is guided by a support chamber or cylinder 18. At the end of the lower connection link or piston rod 14 is a pressure plate or a piston. The pistons place a hydraulic fluid 20 such as hydraulic oil or water, under pressure. A reversible pump/turbine 22 and at least one header 24 move the hydraulic fluid between the cylinders 18 and a reservoir 26 at atmospheric pressure. All the hydraulic fluid 20 such as hydraulic oil or water required is located within the plurality of hydraulic support cylinders or chambers 18 and the atmospheric reservoir 26 at the basement level of the building structure 12. Thus, the basic "pumped storage" hydroelectric concept can be employed without moving large volumes of fluids to large heights. This is accomplished by allowing the structure itself to rise and fall during the pumping and generation cycles. In one embodiment, the structure, a building structure, has the capability of rising and falling in a range of 10–20 feet.

The present invention does not limit itself to windmill power, nuclear power or even its own captive storage battery system for its power source during the pumping part of the cycle. However, depending on the local supply and demand situation during the "off-peak" hours, the probability of "green" power being available (as opposed to fossil-fuel power) for pumping will be higher than during peak demand periods.

An added benefit of the present invention is its foundation design which is inherently earthquake resistant. Thus, a potential energy storage system is a desirable structural approach for new buildings in areas in which there is a shortage of electric generating capacity and there is a risk for seismic activity.

Still referring to FIG. 1, the building structure 12 has a guide system 30 at the building corner surfaces 32 of the building structure 12. The guide system 30 has bracing 34 with guides that roll along the building corner surfaces 32. Extending between the bracing 34 at the corners 32 is a tension link 36.

The building structure 12 has a movable ramp 38. The ramp 38 allows access to the building structure 12 regardless of the building's 12 elevation. This is similar to a gangway for a ship.

Figure 2:
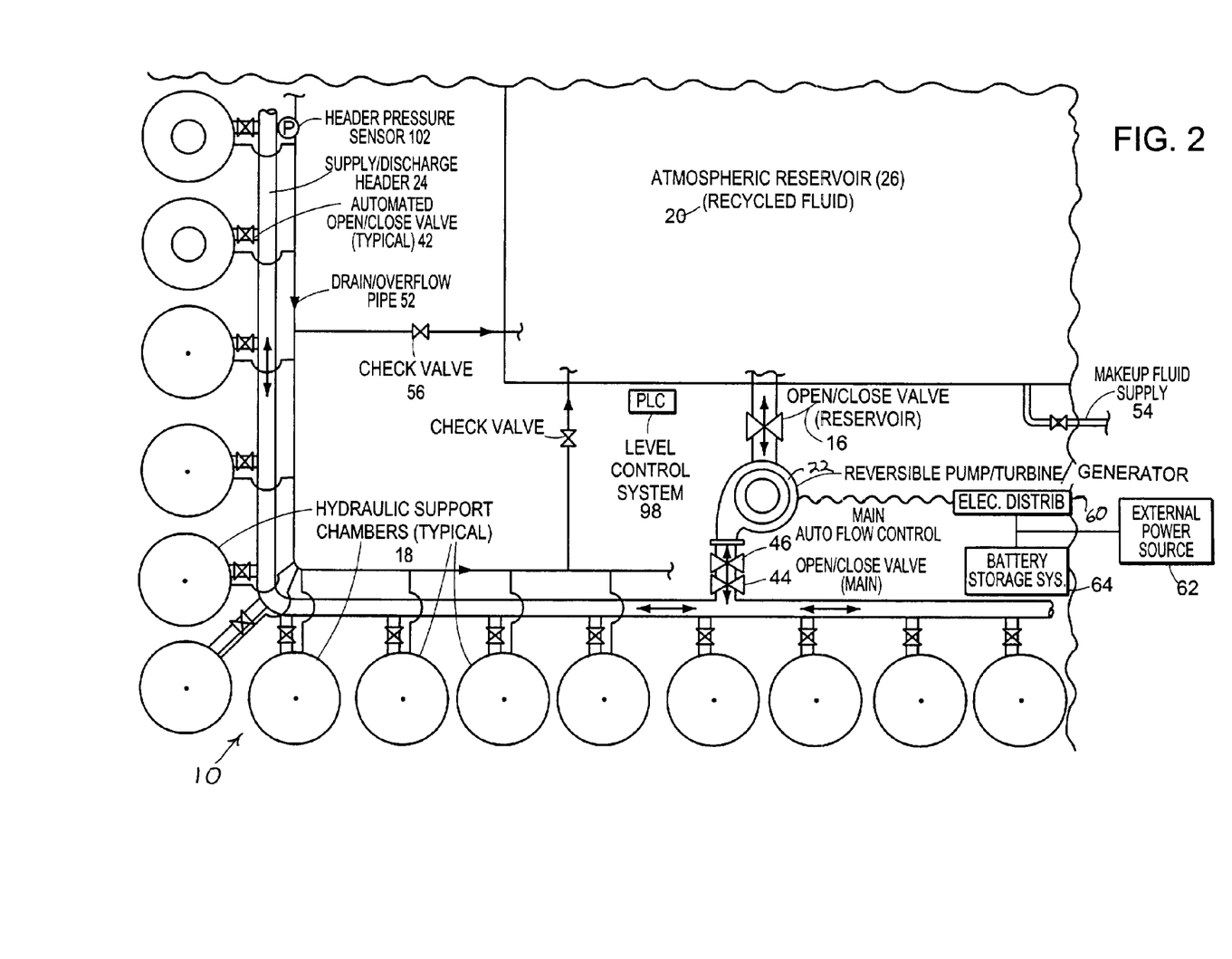
FIG. 2 is a plan view at building incorporating an embodiment of the invention.

A plan view of a schematic of the hydraulic power system 10 is shown in FIG. 2. The hydraulic fluid 20, such as hydraulic fluid or water, discharges from each of the hydraulic chambers or cylinders 18 through an automated chamber valve 42 into the supply and discharge header 24 which transports the fluid through a main valve 44 and into a main automatic flow control valve 46. This automatic flow control valve 46 regulates fluid flow to the reversible pump/turbine/generator unit 22 according to the electrical demand from the generator which is being driven by the hydraulic turbine 22. The turbine discharges the hydraulic fluid through a reservoir valve 48 at the reservoir 26 where it is stored until the pumping cycle begins. During pumping, the reversible pump/turbine/generator unit 22 is rotated in the opposite direction, driven by the generator acting as a motor and driving the turbine 22 as a pump. During this part of the cycle, the fluid follows the same path from the reservoir 26 back to the hydraulic support chambers or cylinders 18.

The chambers or cylinders 18 are in fluid communication with a drain or overflow pipe 52, which is connected to the reservoir 26 and a further makeup fluid supply 54, if needed. The drain/overflow pipe 52 in addition connects to the atmospheric reservoir 26. A check valve 56 prevents fluid from flowing from the reservoir 26 into the drain/overflow pipe 52. The drain/overflow pipe 52 system is used with a water system. In a hydraulic oil system, no drain/overflow pipe 52 is needed because typically the small diameter cylinders experience minimal leakage, as explained with respect to FIG. 6.

The power system 10 has an electrical distribution center 60 which receives and distributes the power to the building during the generation cycle and delivers electrical power (from optional sources) to the motor during the pumping cycle. The distribution center 60 can be connected to an external power source 62 and a battery storage system 64.

Figure 3:
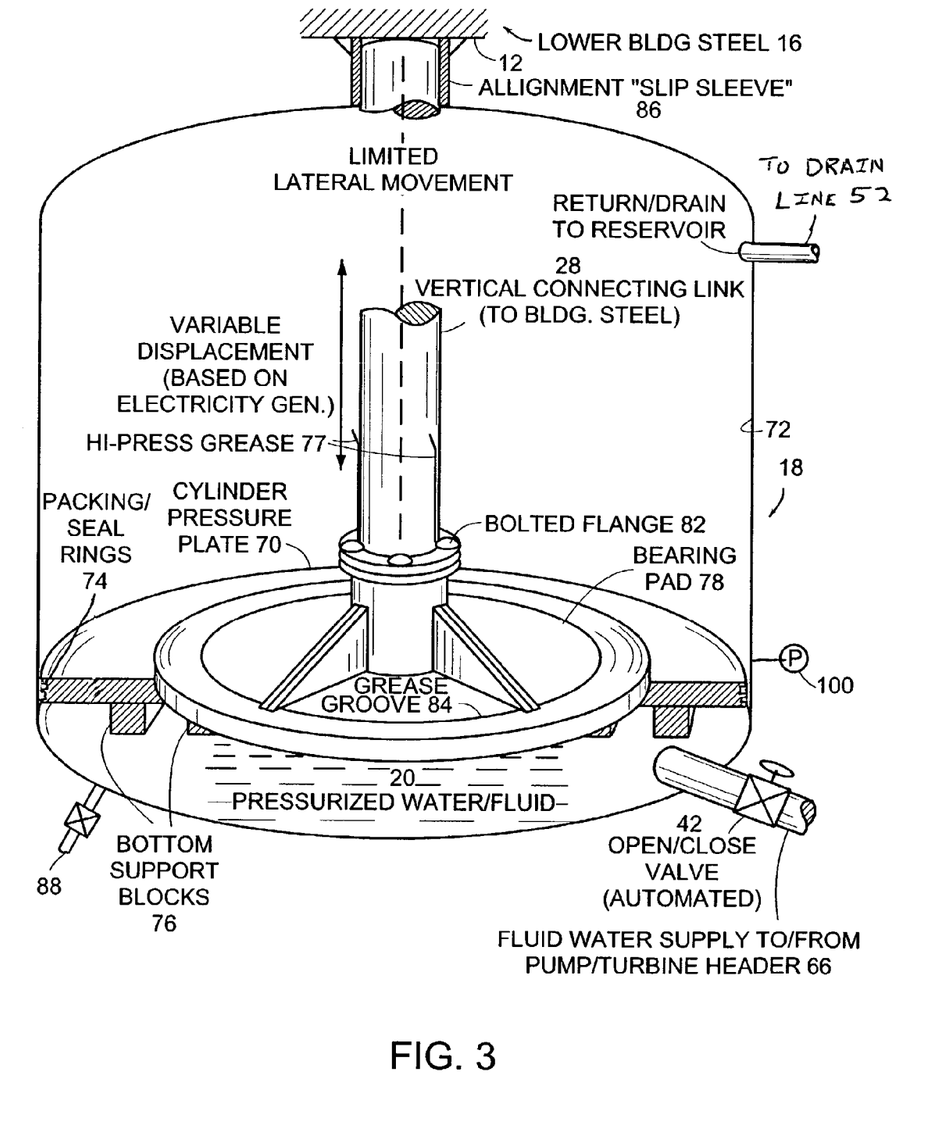
FIG. 3 is a cut-away view of a large diameter, low pressure hydraulic support chamber in accordance with the invention.

FIG. 3 is a cut-away view of a typical water-based hydraulic support chamber or cylinder 18. During the pumping cycle, the hydraulic (water) fluid 20 enters at the bottom of the chamber through a conduit 66 from the supply/discharge header 24. The conduit 66 has the automated chamber valve 24 for the chamber/cylinder 18. The hydraulic fluid 20 pressurizes the chamber volume 68 below a pressure plate 70 which is sealed to an internal wall 72 of the chamber 18 by at least one packing seal ring 74. As the pressure builds up, the pressure plate 70 rises thereby lifting off a plurality of the blocks 76 on the floor of the chamber 18. The pressure plate 70 carries a bearing pad 78 and a vertical connecting link 80 which is rigidly secured at its upper end to the underside of the lower building steel 16. The vertical connecting link 80 is secured to the bearing pad 78 by a bolted flange 82 at is lower end. The hydraulic support chamber 18 has a grease groove 84 that allows slight horizontal movement between the bearing pad 78 and the cylinder pressure plate 76.

Since all the connecting links 80 rise equally due to the equal pressures supplied by the supply and discharge header 24, the entire building structure 12 rises evenly according to the pressure and volume delivered by the fluid pump 22. Each connecting link 80 can be coupled to the structural steel 16 of building structure 12 with an alignment sleeve 86. A bypass line 88 can also connect the chamber to drain line 52 with a normally closed automated valve. The bypass line 88 is used to drain the chamber or cylinder for maintenance or can be used as a backup system for building leveling by reducing pressure in certain cylinders.

In one embodiment, the chambers 18 are open at the top, as seen in FIG. 1. Any fluid that may flow by the packing seal rings 74 flows out the drain line 52. It is recognized that the chamber 18 can be closed on top, similar to the cylinder 118. In one embodiment, the hydraulic fluid is water in a 100–500 PSIG range.

Figure 4:
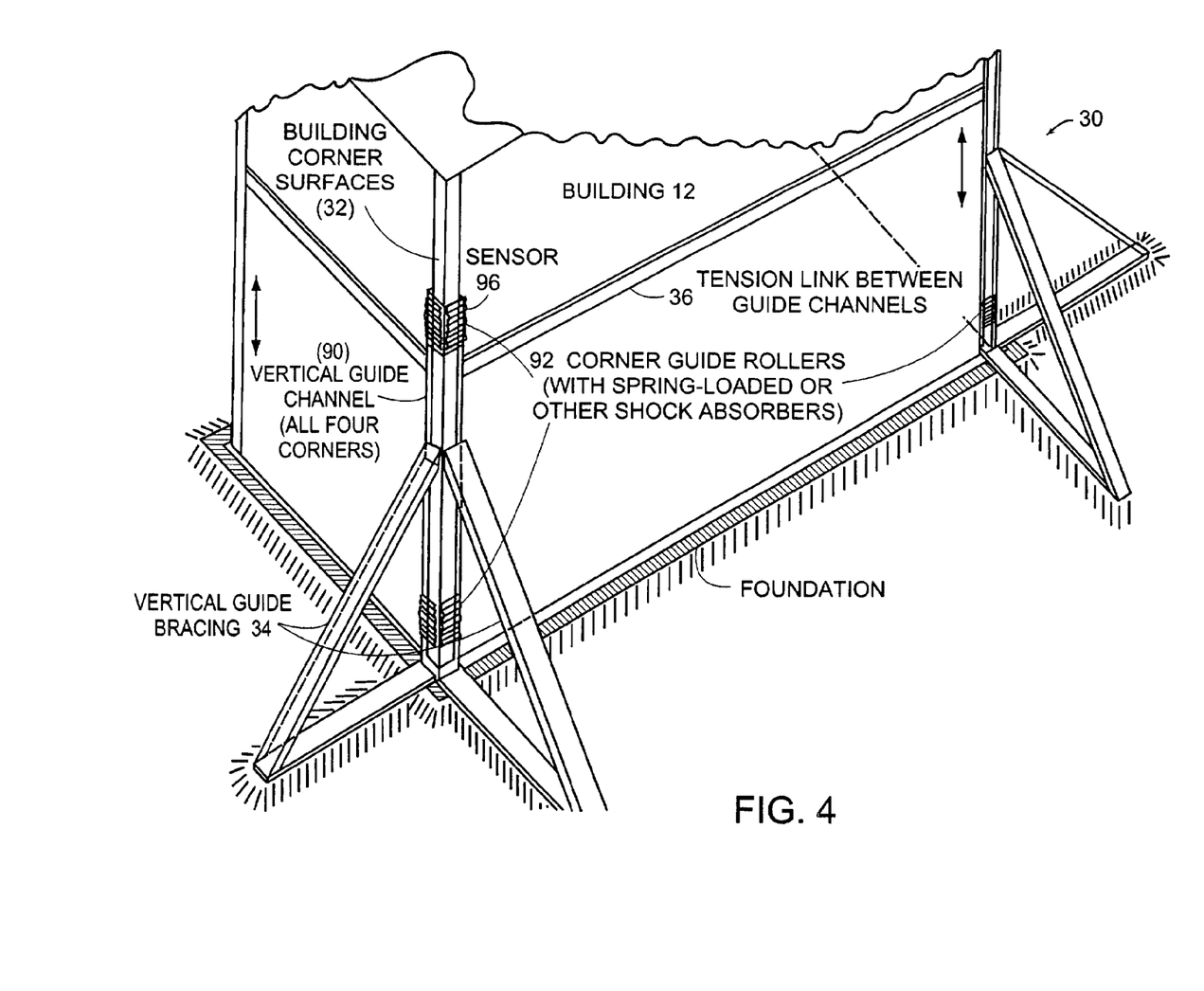
FIG. 4 illustrates in partial perspective view a limited displacement lateral restraint system used in accordance with the invention.

FIG. 4 shows a side elevation of the guide system 30, also referred to as a limited displacement lateral restraint system. The key components of the guide system 30 are a plurality of vertical guide channels or corner guides 90 which hold at least two sets of guide roller assemblies 92 which are adjusted to ride on the outer external corner surfaces 32 of the building structure 12. The roller assemblies 92 are equipped with spring-loaded mounts to allow for some preset horizontal displacement while still maintaining the vertical and level orientation of the building. The rigidity of the vertical guide channels 90 is maintained through appropriate bracing 34 and tension links 36 between corners 32. Each corner guide 90 is equipped with an electronic proximity or position sensor 96 that detects any vertical displacement differences between corners.

The potential energy system 10 includes a PLC-based level control system 98, as schematically shown in FIG. 2, to maintain the horizontal (level) orientation of the building within pre-set limits. This system 98 receives input signals from the proximity sensors 96 at each corner of the building structure 12, as seen in FIG. 4, in order to detect differences in vertical position. If a pre-set difference allowance is exceeded the control system signals the appropriate automated chamber valves 42, as seen in FIG. 2, to close or "throttle" in order to create a pressure imbalance between certain chambers until the "out-of-level" condition is corrected. Fluid pressure levels inside the chambers are also input to the level control system via a pressure sensor 100 on the cylinder 18, as seen in FIG. 3, and these signals are utilized to control the positioning of the automated chamber valves.

It is recognized that structure 12 can be other structures that can rise and lower such as a parking deck structure.

The pressure signals also allow the level control system to act as a safety system to isolate a specific chamber upon significant decrease in pressure level by fully closing the associated chamber automated valve. Likewise, the system can isolate all the cylinders or chambers 18 by closing their respective automatic chamber valves 24 upon any sudden decrease or low pressure indication from a supply/discharge header pressure sensor 102.

Figure 5:
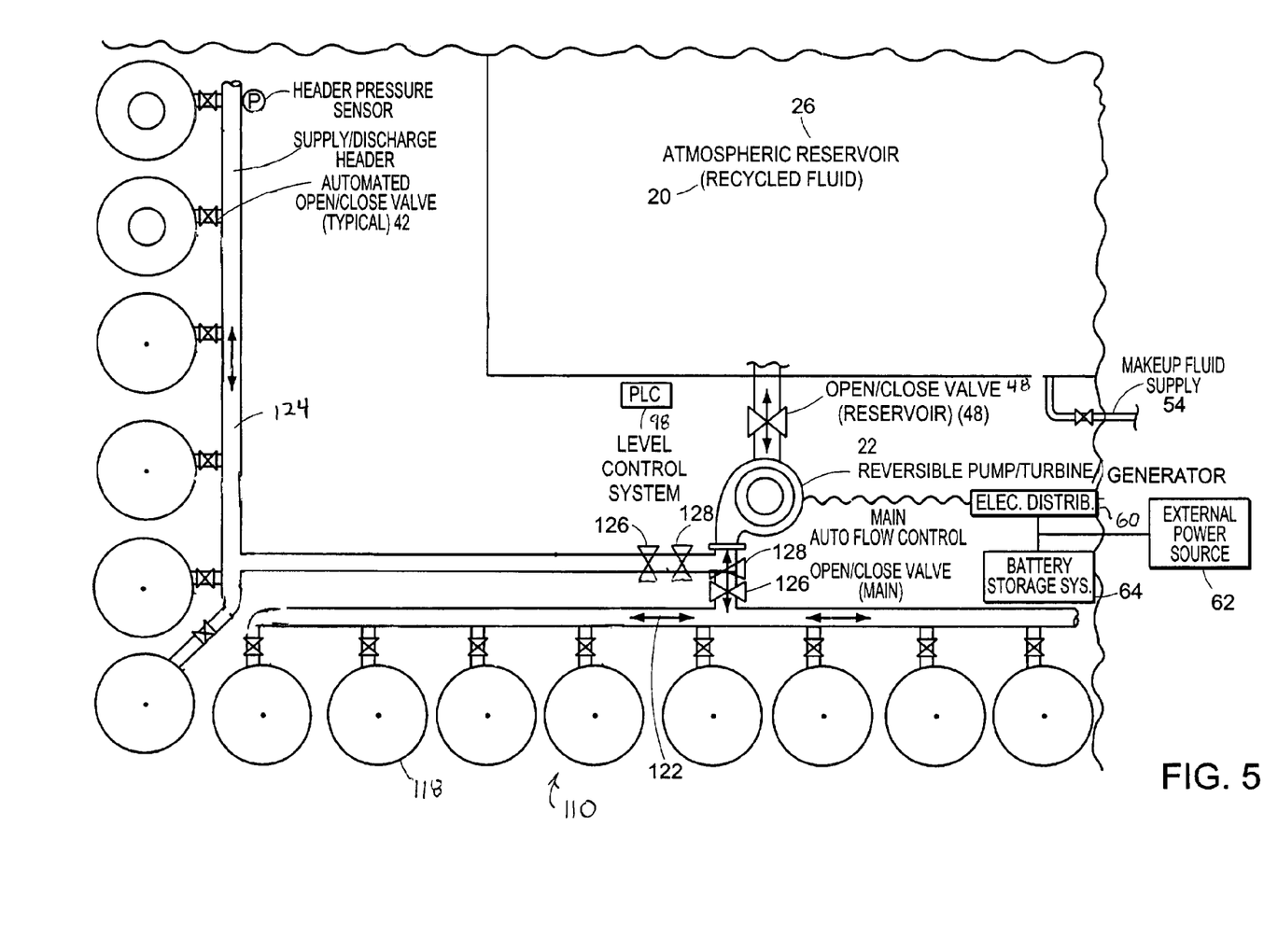
FIG. 5 is a plan view of an alternative embodiment of the power system according to the invention.

A plan view of a schematic of an alternative embodiment of the hydraulic power system 110 is shown in FIG. 5. Similar to the embodiment shown in FIG. 2, the system 110 has a plurality of hydraulic chambers or cylinders 118, a reversible pump/turbine/generator 22 and a reservoir 26. In contrast to the first embodiment, the system 110 has a plurality of distinct supply and discharge headers 122 and 124. Each header 122 and 124 has a main valve 126 and a main automatic flow control valve 128. There is at least one header 122 or 124 for each side of the building structure 12. The hydraulic fluid 20, such as hydraulic oil fluid or water, discharges from each of the hydraulic chambers or cylinders 118 through an automated chamber valve 42 into its respective supply/discharge header 122 or 124. The fluid is transported through the main valve 126 and the main automatic flow control valve 128 for the respective headers 122 and 124. This automatic flow control valve 128 regulates fluid flow to the reversible pump/turbine/generator 22 according to the electrical demand from the generator which is being driven by the hydraulic turbine 22.

Similar to the first embodiment, the turbine 22 discharges the hydraulic fluid 20 through a reservoir valve 48 at the reservoir 26 where it is stored until the pumping cycle begins. During pumping, the reversible pump/turbine/generator unit 22 is rotated in the opposite direction, driven by the generator acting as a motor and driving the turbine 22 as a pump. During this part of the cycle, the fluid follows the same path from the reservoir 26 back to the hydraulic support chambers or cylinders 18.

The power system 110 has an electrical distribution center 60 which receives and distributes the power to the building during the generation cycle and delivers electrical power (from optional sources) to the motor during the pumping cycle. The distribution center 60 can be connected to an external power source 62 and a battery storage system 64.

However, in contrast to the previous embodiment, the system 110 does not have a drain or overflow pipe 52 as seen in FIG. 2, which is connected to the reservoir 26. But the system does have a makeup fluid supply 54 to provide hydraulic fluid, if needed. The lack of the drain/overflow pipe 52 relates to the hydraulic system being a smaller, high pressure system. The smaller diameter, standard design components experience minimal leakage, thus negating the need for an overflow pipe. The top end of the cylinder 118 is fully enclosed. The existence of a drain/overflow pipe system 52 does not relate to whether the system 110 has one or more supply/discharge header 24. In a preferred embodiment, the hydraulic oil system operates in a range of 2,500 to 5,000 pounds per square inch.

Figure 6:
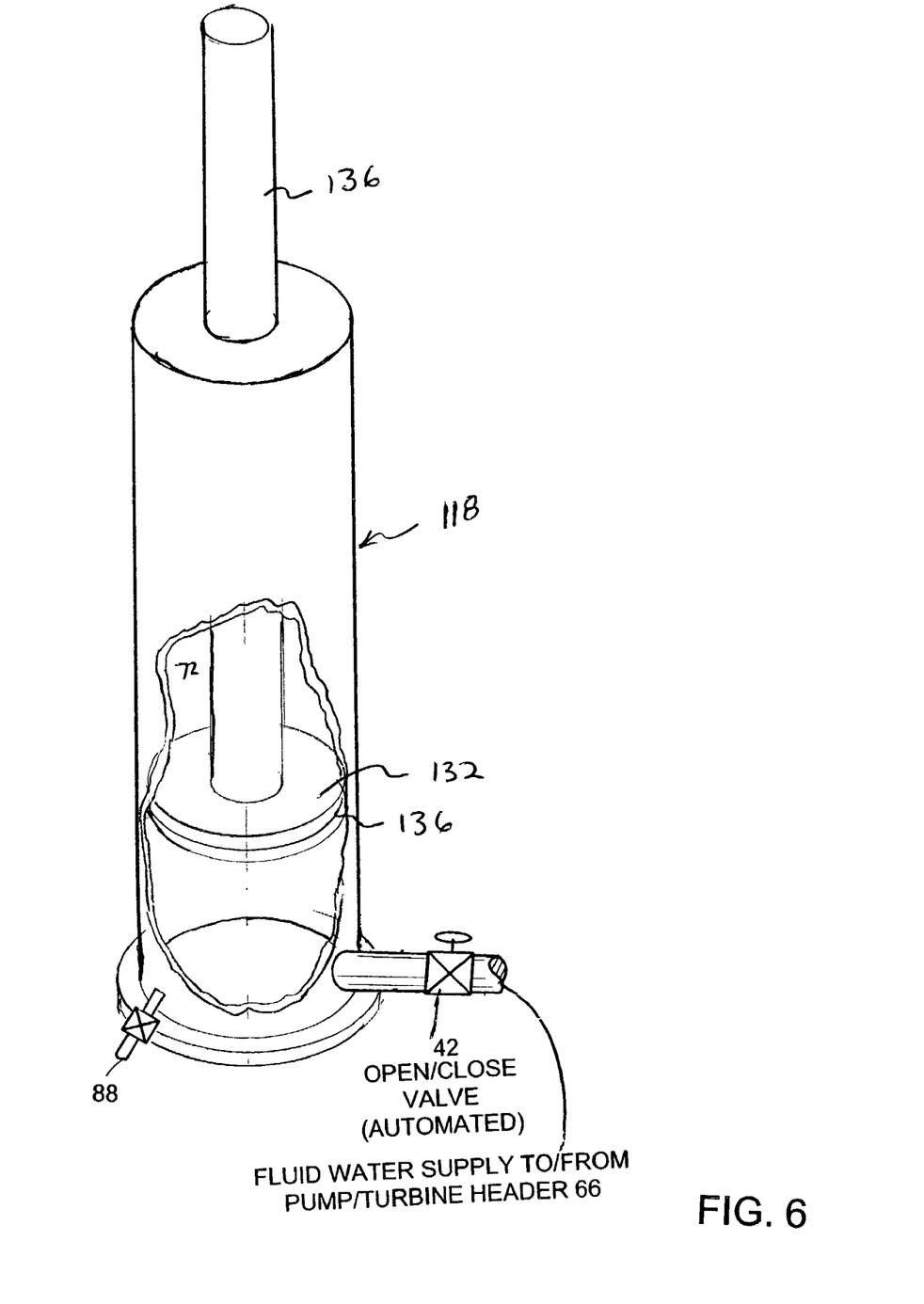
FIG. 6 is a side view with a portion broke away of a small diameter, high pressure hydraulic support cylinder.

FIG. 6 is a perspective view of an alternative embodiment of a hydraulic support cylinder 118 with a portion broken away. During the pumping cycle the hydraulic fluid 20 enters at the bottom of the chamber through a conduit 66 from the supply/discharge header 122 and 124. The conduit 66 has the automated chamber valve 42 for the cylinder 118. The hydraulic fluid 20 pressurizes the cylinder volume 68 below a piston 132 that is sealed to an internal wall 72 of the cylinder 118 by at least one packing seal ring 134. As the pressure builds up, the piston 132 rises thereby moves upward away from the floor of the cylinder 118. The piston 132 is formed integral with a vertical rod 136. The cylinder 118 has a top, with a sealed packing ring opening to allow up and down movement of the rod.

Since all the rods 136 rise equally due to the equal pressures supplied by the supply and discharge header 122 and 124, the entire building structure 12 rises evenly according to the pressure and volume delivered by the fluid pump 22. Similar to the first embodiment, the rods 136 are coupled to the structural steel 16 of building structure 12 with an alignment sleeve 86.

A bypass line 88 is also connected to cylinder 118 to drain the cylinder for maintenance or can be used as a backup system for building leveling by reducing pressure (throttling) in certain cylinders.

It is recognized that the building structure 12 can be designed so that when the building structure 12 is at the lower position, the structural steel 16 is received in supports within the foundation of the building, such as "U" shaped opening in concrete walls. In this embodiment, the cylinders 118 can be removed for servicing.

While the hydraulic oil system as described above has a higher pressure and smaller diameter cylinder than that for systems in which the hydraulic fluid is water, it is recognized that a high pressure water or a low pressure hydraulic oil system that can be used depending upon the specific needs of the system. In addition, other fluids can be used for the hydraulic fluid.

While this invention has been particularly shown and described with references to preferred embodiments thereof, it will be understood by those skilled in the art that various changes in form and details may be made therein without departing from the scope of the invention encompassed by the appended claims.

What is claimed is:

1. An hydraulic power system for a building structure comprising:
   a plurality of hydraulic support cylinders that support the building structure;
   a conduit that supplies fluid to the plurality of hydraulic support cylinders to elevate the building structure;
   a vertical guide that maintains vertical orientation of the building structure;
   a fluid reservoir to retain hydraulic fluid connected to the conduit; and a turbine generator connected to the cylinders that generates electricity during a fluid discharge from the cylinders.

2. The system of claim 1 wherein the turbine generator functions as a pump to deliver fluid to the support cylinder to elevate the structure.

3. The system of claim 1 wherein the building structure is a multi-story office building.

4. The system of claim 1 wherein the structure is a parking deck structure.

5. The system of claim 1 wherein the fluid is hydraulic oil.

6. The system of claim 1 wherein the fluid is water.

7. The system of claim 1 further comprising a limited displacement lateral restraint system.

8. The system of claim 1 wherein the turbine generator functions as a pump, and further comprising an electrical distribution controller that distributes generated power, and at least one valve that controls hydraulic fluid flow to the turbine generator.

9. The system of claim 8 wherein the conduit forms at least two headers, the headers are each associated with a plurality of support cylinders and a valve for allowing leveling of the structure.

10. An hydraulic power system for a building structure comprising:
   an hydraulic support cylinder that supports the building structure;
   a conduit that supplies fluid to the hydraulic support cylinder to elevate the building structure;
   a vertical guide that maintains vertical orientation of the building structure;
   a fluid reservoir to retain hydraulic fluid connected to the conduit;
   a turbine generator connected to the cylinder that generates electricity during a fluid discharge from the cylinder; and
   a limited displacement lateral restraint system comprising:
   vertical guide channels to maintain the vertical orientation of the building during vertical movements;
   an adjustable guide roller assembly within the guide channels and with spring-loading or other shock-absorbing to maintain contact with the outer vertical corner surfaces of the building structure while allowing limited horizontal displacement; and
   suitable bracing system to maintain orientation of the vertical guide channels relative to a building foundation during wind loads.

11. An hydraulic power system for within a building structure comprising:
   an hydraulic support cylinder system having a plurality of support cylinders that support a building structure;
   a conduit that supplies fluid to the hydraulic support cylinder system to elevate or lower the building structure;
   a turbine generator which generates electricity during a fluid discharge from the hydraulic support cylinder system;
   a valve that controls hydraulic fluid flow to the turbine generator;
   a fluid reservoir to collect hydraulic fluid from a turbine generator discharge;
   a volume of fluid deliverable to members of the plurality of support cylinders; and
   an electrical distribution controller that distributes generated power.

12. The system of claim 11 further comprising:
   at least one piston ring to prevent hydraulic fluid leakage between the piston and a wall of the corresponding member of the plurality of support cylinders;
   a vertical connecting rod to couple the upward hydraulic force to a lower building support steel structure; and
   a vertical guide channel having a roller assembly to allow elevation changes of the building while maintaining vertical orientation of the building.

13. The system of claim 11 further comprising a pump to deliver fluid to the corresponding member of the plurality of support cylinders to elevate an entire building structure during off-peak periods.

14. The system of claim 11 further comprising a limited displacement lateral restraint system.

15. The system of claim 11 wherein the turbine further comprises a pump.

16. The system of claim 11 further comprising a cylinder valve that controls fluid flow between each member of the plurality of support cylinders and the conduit.

17. An hydraulic power system for within a building structure comprising:
   an hydraulic support cylinder system having a plurality of support cylinders that supports a building structure;
   a conduit that supplies fluid to the hydraulic support cylinder system to elevate or lower the building structure;
   a turbine generator which generates electricity during a fluid discharge from the support cylinder system;
   a valve that controls hydraulic fluid flow to the turbine generator;
   a fluid reservoir to collect hydraulic fluid from a turbine generator discharge;
   a volume of fluid deliverable to members of the plurality of support cylinders;
   an electrical distribution controller that distributes generated power;
   a pressure plate with a seal to prevent hydraulic fluid leakage between the pressure plate and a wall of a corresponding member of the plurality of support cylinders;
   a bearing pad which is centrally positioned on the pressure plate;
   high pressure lubricant supply to deliver lubricant to the bearing pad to allow relative movement between the bearing pad and the pressure plate;
   a vertical connecting link to couple the upward hydraulic force to a lower building support steel structure; and
   a vertical guide channel having a roller assembly to allow elevation changes of the building while maintaining vertical orientation of the building.

18. A method of generating power comprising:
   delivering fluid to an hydraulic support cylinder to elevate a building structure and a building access;
   controlling delivery of fluid from the support cylinder to a turbine;
   rotating a shaft of a generator by the turbine which generates electricity; and
   distributing generated power from the turbine using an electrical distribution controller.

19. The method of claim 18 further comprising providing a plurality of support cylinders.

20. The method of claim 19 further comprising providing a cylinder valve that controls fluid flow between each support cylinder and fluid delivery to a conduit coupled to a fluid reservoir.

21. The method of claim 18 further comprising:
providing a piston with a seal to prevent hydraulic fluid leakage between the piston and a wall of the cylinder;
coupling an upward hydraulic force to a lower building support steel structure with a vertical connecting rod; and
providing a vertical guide channel having a roller assembly to allow elevation changes of the building while maintaining vertical orientation of the building.

22. The method of claim 18 further comprising pumping fluid to the support cylinder with a pump.

23. The method of claim 18 further comprising providing a limited displacement lateral restraint system.

24. The method of claim 18 further comprising pumping fluid to the support cylinder with the turbine in a pump mode.

25. The method of claims 18 further comprising providing a system controller and a battery storage system.

26. A method of generating power comprising:
delivering fluid to an hydraulic support cylinder to elevate a building structure and a building access;
controlling delivery of fluid from the support cylinder to a turbine;
rotating a shaft of a generator by the turbine which generates electricity;
an electrical distribution controller that distributes generated power from the turbine;
providing a pressure plate with a seal to prevent hydraulic fluid leakage between the plate and a wall of the cylinder;
providing a bearing pad which is centrally positioned on the pressure plate;
delivering lubricant to the bearing pad to allow relative movement between the bearing pad and the pressure plate;
coupling an upward hydraulic force to a lower building support steel structure with a vertical connecting link; and
providing a vertical guide channel having a roller assembly to allow elevation changes of the building while maintaining vertical orientation of the building.

27. A method of generating power comprising:
delivering fluid to an hydraulic support cylinder to elevate a building structure and a building access;
controlling delivery of fluid from the support cylinder to a turbine;
rotating a shaft of a generator by the turbine which generates electricity;
using an electrical distribution controller distributing generated power from the turbine; and
providing an external limited displacement lateral restraint system to allow a controlled, relative horizontal movement between the building structure and a fixed foundation and allow vertical and level movement of the building structure relative to the foundation, the system having:
vertical guide channels to maintain the vertical orientation of the building during vertical movements;
an adjustable guide roller assembly within the guide channels and with spring-loading or other shock-absorbing to maintain contact with the outer vertical corner surfaces of the building steel structure while allowing horizontal displacement; and
suitable bracing system to maintain orientation of the vertical guide channels relative to the building foundation during wind loads.

* * * * *